United States Patent [19]

Kalnins

[11] Patent Number: 5,049,277

[45] Date of Patent: Sep. 17, 1991

[54] CYCLONE SEPARATOR

[75] Inventor: Charles M. Kalnins, The Woodlands, Tex.

[73] Assignee: Conoco Specialty Products Inc., Houston, Tex.

[21] Appl. No.: 457,741

[22] PCT Filed: Mar. 17, 1989

[86] PCT No.: PCT/AU89/00109

§ 371 Date: Dec. 11, 1989

§ 102(e) Date: Dec. 11, 1989

[87] PCT Pub. No.: WO89/08503

PCT Pub. Date: Sep. 21, 1989

[30] Foreign Application Priority Data

Mar. 17, 1988 [AU] Australia .................................. PI298
Oct. 14, 1988 [AU] Australia .................................. PJ0944

[51] Int. Cl.⁵ .......................................... B01D 17/038
[52] U.S. Cl. .................................. 210/512.1; 210/788
[58] Field of Search ............................. 210/512.1, 788

[56] References Cited

U.S. PATENT DOCUMENTS

| 3,437,205 | 4/1969 | Condolois | 210/788 |
| 3,616,909 | 11/1971 | Lowery et al. | 210/788 |
| 4,237,006 | 12/1980 | Colman et al. | 210/788 |
| 4,371,382 | 2/1983 | Ross | 210/788 X |
| 4,849,107 | 7/1989 | Thew | 210/512.1 |

Primary Examiner—Charles Hart
Attorney, Agent, or Firm—John E. Holder

[57] ABSTRACT

Cyclone separator for separating liquid components from a liquid mixture, having an axially extending separating chamber (12) with an underflow outlet (22) for outlet of more dense components at one end thereof and an overflow outlet (18) for outlet of less dense components at the other end thereof, the separating chamber having a portion (16) which exhibts a taper, in the direction towards the underflow outlet, the taper angle (half angle to the separating chamber axis) of $1\frac{1}{2}°$ to $3°$.

14 Claims, 2 Drawing Sheets

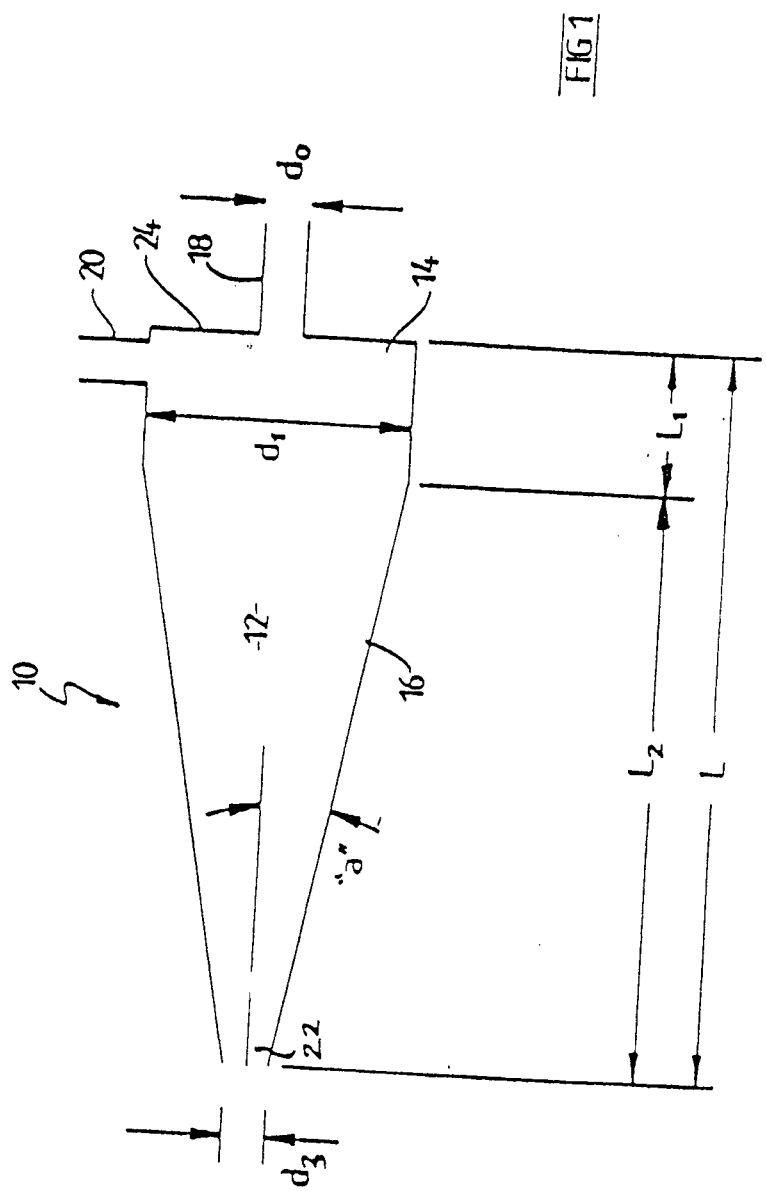

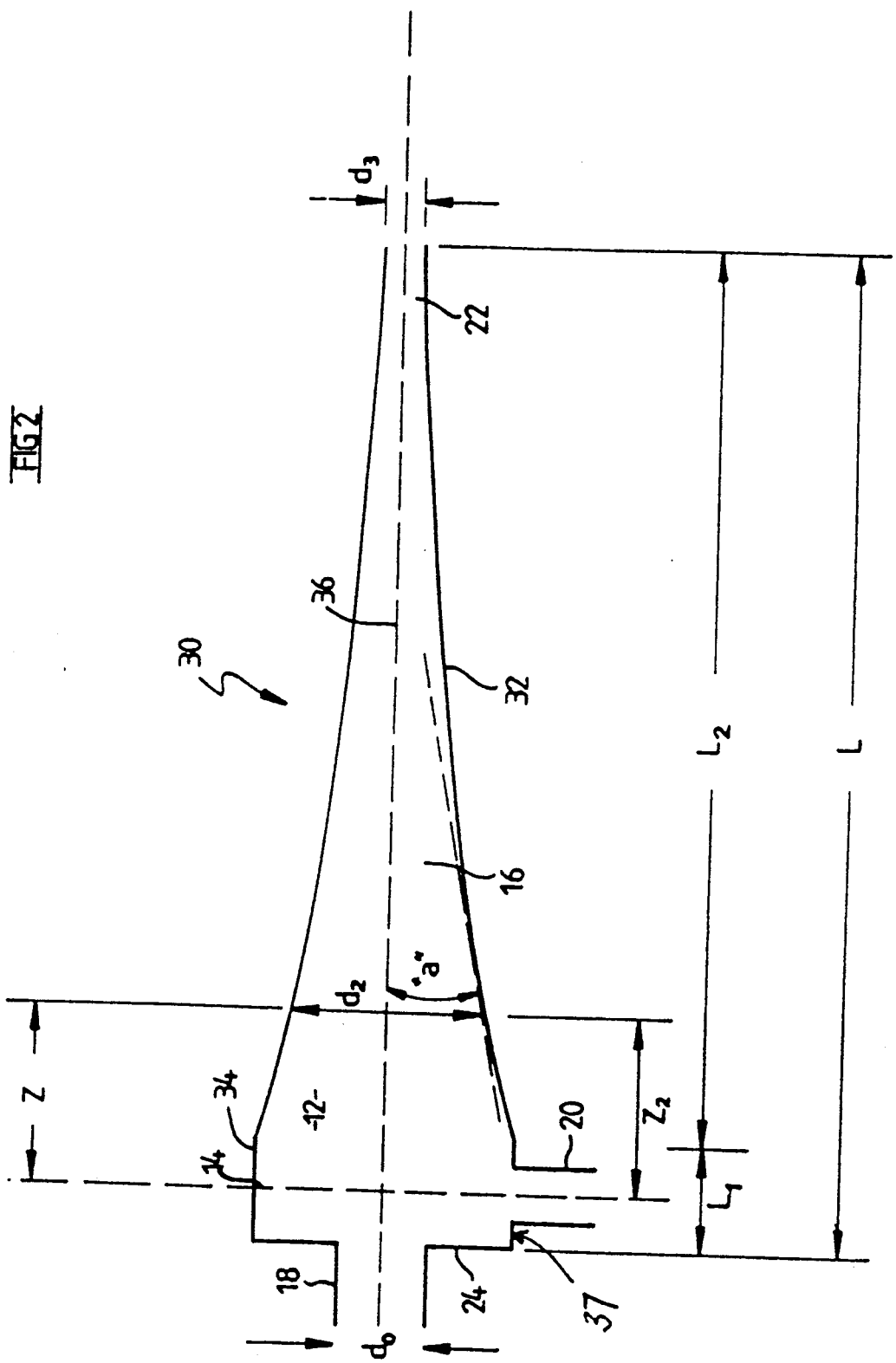

CYCLONE SEPARATOR

This invention relates to Cyclone Separators.

In accordance with one aspect of the invention there is provided a cyclone separator for separating liquid components in a mixture thereof and having an elongate separating chamber in the form of a surface of revolution which over at least a substantial portion thereof exhibits a taper, from a location towards one larger diameter end of the separating chamber to a location towards another smaller diameter end thereof, the separating chamber being provided with inlet means in the form of at least one inlet disposed at or adjacent said one end of the separating chamber and arranged for inflow of the liquid to the separated into the separating chamber with a tangential component of motion, the separator having an axial overflow outlet at said one end thereof and an axial underflow outlet at said other end, said portion having a taper such that, when viewed in axial section, tangents thereto at substantially all locations along the length thereof make a taper angle in the range $1\frac{1}{2}°$ to $3°$ to the axis of the separating chamber, and wherein the following relationships also apply:

where $d_1$ is the diameter of the said separating chamber where flow enters, preferably in an inlet portion at said one end of said separating chamber, (but neglecting any feed channel) $d_{ix}$ is twice the radius at which flow enters the cyclone through the $x^{th}$ inlet (i.e., twice the minimum distance of the tangential component of the inlet centre line from the axis) and $$d_i = \frac{1}{A_i} \sum_{x=1}^{x=n} d_{ix} A_{ix}$$

where $A_{ix}$ is the projection of the cross sectional area of $x^{th}$ inlet measured at entry to the cyclone separator in a plane parallel to the axis of the cyclone separator which is normal to the plane, also parallel to the cyclone axis which contains the tangential component of the inlet centre line, and where:

$$A_i = \sum_{x=1}^{x=n} A_{ix}$$

and $$3 \leq \frac{\pi d_i^2}{8 A_i} \leq 30 \text{ or preferably } 20$$

or if $d_2$ as hereinafter described is defined, $$3 \leq \frac{\pi d_i d_2}{4 A_i} \leq 30 \text{ or preferably } 20$$

In the case where the separating chamber has no substantial part over which the said taper angle is equal to or less than $3°$, other than a portion over which this taper angle is substantially zero, the parameter $d_2$ is undefined. Where the separating chamber, possibly with a part adjacent said one end which has substantially zero taper, has a part over which the taper angle varies from a value greater than $3°$ to a value equal to or less than $3°$, $d_2$ is defined as the diameter of the separating chamber at the lengthwise location at which the taper angle first becomes so equal to or less than $3°$ i.e., $d_2$ is the diameter of the separating chamber measured at the point $z_2$ where the condition first applies that $$\tan^{-1} \frac{d_2 - d}{2(z - z_2)} \leq 3°$$

for all $z > z_2$ where $z$ is the distance along the cyclone separator axis downstream of the plane containing the inlet is located (or considered to be located as next described herein if there is more than one inlet) and $d$ is the diameter of the cyclone at $z$. Generally, where there are "x" inlets, the point $z=0$ is the axial position of the weighted areas of the inlets such that the injection of angular momentum into the cyclone separator is equally distributed axially about said axial position where $z=0$ and being defined by:

$$\frac{1}{A_i d_i} \sum_{x=1}^{x=n} z_x A_{ix} d_{ix} = 0$$

where $z_x$ is the axial position of the $x^{th}$ inlet.

The said portion may be straight sided, or exhibit a variation in taper over its length, such as wherein the aforedescribed taper angle varies from a relatively greater angle at locations towards said one end of the separating chamber to a relatively lesser angle at locations towards said another end.

In one construction, the tapered portion extends over substantially the whole length of the separating chamber. In other constructions, the separating chamber may be provided, adjacent said one end thereof, with an inlet portion into which the or each said inlet extends, the inlet portion being substantially cylindrical.

The overall length of the separator may be in the range 10 to 20 times the diameter of the separating chamber at such one end, such as 14 times such diameter. The underflow outlet may have a diameter in the range $1/5^{th}$ to $1/15^{th}$ times the diameter of the separating chamber at said one end. The overflow outlet may have a diameter in the range $1/10^{th}$ to $1/30^{th}$ times such diameter. The inletportion, where provided, may be of length in the range 0.5 to 1.5 times the diameter of the separating chamber at said one end.

The invention is further described by way of example with reference to the accompanying drawings in which:

FIG. 1 is a diagrammatic representation of a separator constructed in accordance with the invention; and FIG. 2 is a diagrammatic representation of a further separator constructed in accordance with the invention.

The cyclone separator 10 shown in FIG. 1 has a separating chamber 12 having a first or inlet portion 14 of generally cylindrical form and a second or separating portion 16 of tapered form. There is, at the larger diameter end of the separating chamber, an overflow outlet 18. At this end, too, there is provided inlet means in the form of one or more inlets 20, the or each inlet being arranged to provide inflow into the separating chamber, adjacent the larger diameter end thereof, such that the inlet liquid has a tangential component. The portion 16 of the separating chamber extends from the portion 14 to an underflow outlet 22 where the smaller outlet is at diameter end of the portion 16.

In the figure, the following parameters are shown:

TABLE 1

| | |
|---|---|
| L = | overall length of the separating chamber. |
| L1 | overall length of the inlet portion 14 of the separating chamber. |
| L2 | overall length of the separating portion 16 of the separating chamber. |

TABLE 1-continued

| | |
|---|---|
| $d_0$ | Diameter of the overflow outlet. |
| $d_1$ | Diameter of the separating portion 16 at the larger diameter end; diameter of inlet portion 14. |
| $d_3$ | Diameter of the underflow outlet; diameter of separating portion 16 at its smaller diameter end. |
| a | half angle of taper of separating portion 16. |

It is preferred that these parameters have the following values.

TABLE 2

| PARAMETER | RANGE |
|---|---|
| L | 10 $d_1$ to 40 $d_1$ such as 10 $d_1$ to 20 $d_1$ |
| L1 | 0.5 $d_1$ to 1.5 $d_1$ such as 0.5 $d_1$ to 1.0 $d_1$ |
| L2 | 9 $d_1$ to 19 $d_1$ |
| $d_o$ | 0.015 $d_1$ to 0.35 $d_1$ such as $1/10^{th}\, d_1$ to $1/30^{th}\, d_1$ |
| $d_3$ | 0.05 $d_1$ to 0.9 $d_1$ such as $\frac{1}{5} d_1$ to $\frac{1}{15} d_1$ |
| a | $1\frac{1}{2}°$ to $3°$ |

Additionally, there is a parameter, the "swirl number" associated with the design of the separator and which swirl number, designated "S.N." is approximated as follows:

$$S.N. = \frac{\pi d_1^2}{8A_i} \text{ or } \frac{\pi d_i^2}{8A_i}$$

where $$A_i = \sum_{x=1}^{x=n} A_{ix}$$

$A_{ix}$ being the projection of the cross-sectional area of $x^{the}$ inlet measured at entry to the cyclone separator in a plane parallel to the axis of the cyclone separator which is normal to the plane, also parallel to the cyclone axis, which contains the tangential component of the inlet centre line, and $d_1$ is the diameter of the separating chamber at said one end.

For effective operation of the separator, the separator should be designed such that this swirl number falls in the range 3 to 30 or preferably 3 to 20.

Generally speaking, the swirl number may be chosen to have a lower value where the liquid to be separated has a high pressure and a higher value where the pressure is lower.

In a use, the liquid to be separated in passed into the separating chamber 12 via the or each inlet 20, and then executes a spiral motion, the heavier liquid component in the inlet liquid migrating towards the wall of the separating chamber, and the lighter component forming a central core. The heavier component moves lengthwise from the larger diameter to the smaller diameter end of the separator and emerges from the underflow outlet 22. The lighter component is subjected to differential pressure forces which force it to move axially of the separator out through the overflow outlet 18.

Separators constructed in accordance with the above have been found to be suitable for separating oil-water mixtures, particularly mixtures of oil and water having a relatively low proportion of oil such as a few percent or less.

Generally, the taper angle "a" may be selected to have a greater value where the material to be separated has a high viscosity and a lower value where the liquid to be separated has a low viscosity.

The separator as described has been found to be comparable in efficiency to separators of the kind described in, for example, U.S. Pat. Nos. 4,237,006 and 4,576,724 and International applications No. PCT/AU85/00010. However, the separator has a relatively simpler construction, and may also be constructed so to be of relatively lesser length than separators of the kinds described in these patent specifications.

Furthermore, the relatively greater taper angle of the portion 16, as compared with the taper angle of the substantial part of the separating chambers in each of these prior specifications permits of a relatively higher pressure drop being taken over the separator as from the inlet thereof to the underflow outlet thereof, whereby it is often possible to eliminate the use of a flow restricting device a the underflow outlet as is, for example, generally necessary with separators as described in the three prior patent specifications last mentioned. Such a flow restriction device is described in the specification of International application PCT/AU83/00028.

While, as shown, the separator terminates at the underflow outlet 22 immediately at the smaller diameter end of the portion 16, it is possible to add further portions to the separating chamber. For example a short portion of constant diameter may be added to the separator at the smaller diameter end so that the underflow outlet is then defined at the outlet of this portion. Furthermore, although the separating chamber is shown as having two distinct portions, the generally cylindrical portion 14 and the tapered portion 16, these portions may be merged such that the separating chamber exhibits a taper over the whole of its length from its larger diameter to its smaller diameter end. Again, although the taper of the portion 16 is shown as being constant, the taper may vary, such as exhibiting a greater taper angle at the larger diameter end than at the smaller diameter end.

The or each inlet 20 may be in the form of a parallel sided inlet duct positioned to direct the flow inwardly, and substantially tangentially to the wall of the chamber portion 14. Advantageously two or more such inlets may be provided equally-angularly disposed around the separator axis. Alternatively one or more "involute" type inlets may be provided such as described in the aforementioned International application No. PCT/AU85/00010. Generally, the or each inlet may be arranged adjacent the end wall 24 of the separator, being the end wall at the larger diameter end of the separating chamber, although the or each be spaced somewhat away from such wall. Also, although the single inlet 20 shown is arranged with its axis at right angles to the axis of the separating chamber, this is not essential as the or each inlet may be arranged so as to make an angle to such axis. In particular, the or each inlet may be angled to the separator axis so as to introduce the incoming liquid to be separated with a component of motion in the direction from the larger diameter to the smaller diameter end of the separator chamber.

EXAMPLE

A cyclone separator as shown in the drawing was constructed, having the following dimensions:

TABLE 3

| PARAMETER | VALUE |
| --- | --- |
| L | 1045 mm |
| L1 | 70 mm |
| L2 | 975 mm |
| d0 | 3 mm |
| d1 | 70 mm |
| d3 | 7 mm |
| a | 1.85° |

In addition, the separating chamber was provided with a single inlet 20 in the form of a parallel sided tangential duct of circular cross-section having a diameter of 12.7 mm. This was positioned adjacent to the end wall 24. With this construction, the swirl number, S.N., was approximately 7.4 to 7.5.

The separator was tested for separating a mixture of oil in water with a substantial proportion of water in the mixture.

The following results were obtained:

TABLE 4

| Q | Pin | Pout | Prej | R | Cin | Cout | E |
| --- | --- | --- | --- | --- | --- | --- | --- |
| 110 | 620 | 245 | 275 | 2,73 mm 2,5% | 855 | 335 | 60,8 |
|  |  |  |  |  | 945 | 392 | 58,5 |
|  |  |  |  |  |  | Ave | 59,6 |

In the table, the parameter mentioned therein are as follows:

TABLE 5

| PARAMETER | IDENTITY | UNITS |
| --- | --- | --- |
| Q | volumetric flow | liter minute |
| Pin | Pressure of inlet liquid at inlet 20 | kPa |
| Pout | Pressure of liquid (water) at the underflow outlet 22. | kPa |
| Prej | Pressure of liquid (oil) at the overflow outlet 18 | kPa |
| R | Reject ratio: ratio of overflow outlet volumetric flow to inlet volumetric flow | — |
| Cin | Concentration of oil in inlet liquid | ppm |
| Cout | Concentrate of oil in the outlet liquid at the underflow outlet | ppm |
| E | Efficiency: ratio: (Cin−Cout)/(Cin) | % |

While the separation efficiency, E, is rather less than that obtainable from separators constructed in accordance with the teachings of the abovementioned prior patent specifications, the results are by no means unsatisfactory and the relatively simpler and more compact construction forwards substantial advantages under certain conditions.

In FIG. 1 the separator shown has no portion over which the angle "a" is greater than 3°. In cases where the angle "a" exhibits a change from a diameter greater than 3° to a diameter equal to or less than 3°, reckoned in the direction away from the larger diameter end of the separating chamber, there is defined, in accordance with this invention, a parameter $d_2$, being the diameter of the separating chamber at the location where the angle "a" so first becomes equal to or less than 3°. FIG. 2 shows such a construction.

In FIG. 2, the separator 30 shown is of similar, but not identical, form to that shown in FIG. 1. In FIG. 2, like reference numerals and indicated designated parameters designate like components and parameters to those shown in FIG. 1. The separator 30 is also similar in its construction and operation to the separator 10, and the following description is confined to differences as between the two constructions. More particularly, in this separator 30, the separating chamber has a part 37, at the larger diameter end thereof, which is cylindrical in configuration with a straight side wall 34, parallel to the axis 36 of the separator. Then, there is defined a part of the separating chamber having a curved side wall 32 which extends from part 37 to the underflow outlet 22.

In this instance, the inlet portion 14 of the separating chamber is defined as that portion thereof which is between the larger diameter end wall 24 of the separating chamber and the location where the separating chamber possesses a diameter $d_2$ as described next. The diameter $d_2$ prevails at a location $z_2$ in the axial direction of the separator measured downstream from the position of the inlets 20. In a general case, where not all of the inlets are at the same location, the point $z=0$ is defined as the axial position of the weighted areas of the inlets such that the injection of angular momentum into the cyclone separator is equally distributed axially about the axial position where $z=0$ and being defined by:

$$\frac{1}{A_i d_i} \sum_{x=1}^{x=n} z_x A_{ix} d_{ix} = 0$$

where $z_x$ is the axial position of the $x^{th}$ inlet.

By this definition, $d_2$ is the diameter measured at the point $z_2$ where the condition first applies such that:

$$\tan^{-1}\frac{d_2 - d}{2(z - z_2)} \leq 3°$$

By the above definition, the aforementioned separating portion 16 of the separator comprises the portion between the axial location at which diameter $d_2$ prevails and the underflow outlet 22.

In the case where the diameter $d_2$ is defined as abovementioned, the swirl number is given by the formula:

$$S.N. = \frac{\pi d_1 d_2}{4 A_i} \text{ or } \frac{\pi d_i d_2}{4 A_i}$$

rather than by the abovementioned formula involving only, of the parameters $d_1$ and $d_2$, the parameter $d_1$.

As above described, in both FIGS. 1 and 2, the diameter $d_1$ is the diameter of the separating chamber where flow enters, such as at the inlet portion 14 described, and at the larger diameter end of the separating chamber (but neglecting any feed channel). Generally, taking $d_{ix}$ as being twice the radius at which flow enters the cyclone through the $x^{th}$ inlet (i.e., twice the minimum distance of the tangential component of the inlet center line from the axis) the following relationship should apply in each case:

$$d_i = \frac{1}{A_i} \sum_{x=1}^{x=n} d_{ix} A_{ix}$$

where $A_{ix}$ is the projection of the cross sectional area of $x^{th}$ inlet measured at entry to the cyclone separator in a plane parallel to the axis of the cyclone separator which is normal to the plane, also parallel to the cyclone axis which contains the tangential component of the inlet ceter line, and where:

$$A_i = \sum_{x=1}^{x=n} A_{ix}$$

Generally, where the cyclone separator has a parallel sided (cylindrical) inlet portion such as portion 14, the term $d_i$ above described is equal to the term $d_1$, and these terms may be used interchangeably in the formulae expressed for the swirl number S.N. Otherwise, it is preferred to use the term $d_i$ therein.

The described construction has been advanced merely by way explanation and many modifications and variations may be made thereto without departing from the spirit and scope of the invention as defined in the appended claims.

I claim:

1. A cyclone separator for separating oil and water liquid components in a mixture thereof and having an elongate separating chamber in the form of a surface of revolution which over at least a substantial portion thereof exhibits a variation in taper, from a location towards one larger diameter end of the separating chamber to a location towards another smaller diameter end thereof, with the variation in taper thereof varying from a relatively greater angle at locations towards said one end of the separating chamber to a relatively lesser angle at locations towards said another end, the separating chamber being provided with inlet means in the form of at least one inlet disposed at or adjacent said one end of the separating chamber and arranged for inflow of the liquid to the separated into the separating chamber with a tangential component of motion, the separator having an axial overflow outlet at said one end thereof and an axial underflow outlet at said other end, said portion having a taper such that, when viewed in axial section, tangents thereto at substantially all locations along the length thereof make a taper angle in the range $1\frac{1}{2}°$ to $3°$ to the axis of the separating chamber, and wherein the following relationships also apply: where $d_1$ is the diameter of the said separating chamber where flow enters, preferably in an inlet portion at said one end of said separating chamber, (but neglecting any feed channel) $d_{ix}$ is twice the radius at which flow enters the cyclone through the $x^{th}$ inlet (i.e., twice the minimum distance of the tangential component of the inlet center line from the axis) and $$d_i = \frac{1}{A_i} \sum_{x=1}^{x=n} d_{ix} A_{ix}$$

where $A_{ix}$ is the projection of the cross sectional area of $x^{th}$ inlet measured at entry to the cyclone separator in a plane parallel to the axis of the cyclone separator which is normal to the plane, also parallel to the cyclone axis which contains the tangential component of the inlet center line, and where:

$$A_i = \sum_{x=1}^{x=n} A_{ix}$$

and $$3 \leq \frac{\pi d_i^2}{8 A_i} \leq 30 \text{ or preferably } 20$$

2. A cyclone separator for separating oil and water liquid components in a mixture thereof and having an elongate separating chamber in the form of a surface of revolution which over at least a substantial portion thereof exhibits a variation in taper, from a location towards one larger diameter end of the separating chamber to a location towards another smaller diameter end thereof, with the variation in taper thereof varying from a relatively greater angle at locations towards said one end of the separating chamber to a relatively lesser angle at locations towards said another end, the separating chamber being provided with inlet means in the form of at least one inlet disposed at or adjacent said one end of the separating chamber and arranged for inflow of the liquid to the separated into the separating chamber with a tangential component of motion, the separator having an axial overflow outlet at said one end thereof and an axial underflow outlet at said other end, said portion having a taper such that, when viewed in axial section, tangents thereto at substantially all locations along the length thereof make a taper angle in the range $1\frac{1}{2}°$ to $3°$ to the axis of the separating chamber, and wherein the following relationships also apply: where $d_1$ is the diameter of the said separating chamber where flow enters, preferably in an inlet portion at said one end of said separating chamber, (but neglecting any feed channel) $d_{ix}$ is twice the radius at which flow enters the cyclone through the $x^{th}$ inlet (i.e., twice the minimum distance of the tangential component of the inlet center line from the axis) and $$d_i = \frac{1}{A_i} \sum_{x=1}^{x=n} d_{ix} A_{ix}$$

where $A_{ix}$ is the projection of the cross sectional area of $x^{th}$ inlet measured at entry to the cyclone separator in a plane parallel to the axis of the cyclone separator which is normal to the plane, also parallel to the cyclone axis which contains the tangential component of the inlet center line, and where:

$$A_i = \sum_{x=1}^{x=n} A_{ix}$$

and $$3 \leq \frac{\pi d_i^2}{8 A_i} \leq 30 \text{ or preferably } 20$$

and $d_2$ is the diameter of the separating chamber at the location where said portion begins.

3. A cyclone separator as claimed in claim 2 wherein the separating chamber except, possibly for a part adjacent said one end which has substantially zero taper, has a part over which the taper angle varies from a value greater than $3°$ to a value equal to or less than $3°$, $d_2$ is the diameter of the separating chamber measured at the point $z_2$ where the condition first applies that $$\tan^{-1}\frac{d_2 - d}{2(z - z_2)} \leq 3°$$

for all $z > z_2$ where z is the distance along the cyclone separator axis downstream of the plane containing the inlet is located (or considered to be located if there is more than one inlet) and d is the diameter of the cyclone at z.

4. A cyclone separator as claimed in claim 3 wherein there are 'x' inlets and the point $z=0$ is the axial position of the weighted areas of the inlets such that the injection of angular momentum into the cyclone separator is equally distributed axially about said axial position where $z=0$ and being defined by:

$$\frac{1}{A_i d_i} \sum_{x=1}^{x=n} z_x A_{ix} d_{ix} = 0$$

where $z_x$ is the axial position of the $x^{th}$ inlet.

5. A cyclone separator as claimed in any one of claims 1 and 2 wherein the tapered portion extends over substantially the whole length of the separating chamber.

6. A cyclone separator as claimed in any one of claims 1 and 2 wherein the overall length of the separator is in the range 10 to 40 times the diameter of the separating chamber at said one end.

7. A cyclone separator as claimed in claim 6 wherein the overall length of the separator is in the range 10 to 20 times the diameter of the separating chamber at said one end.

8. A cyclone separator as claimed in claim 7 wherein the overall length of the separator is substantially fourteen times said diameter at said one end.

9. A cyclone separator as claimed in one of claims 1 and 2 wherein said underflow outlet has a diameter in the range 0.05 to 0.9 times the diameter of the separating chamber at said one end.

10. A cyclone separator as claimed in claim 9 wherein said underflow outlet has a diameter in the range $1/5^{th}$ to $1/15^{th}$ times the diameter of the separating chamber at said one end.

11. A cyclone separator as claimed in any one of claims 1 and 2 wherein the overflow outlet has a diameter in the range 0.015 to 0.35 said diameter at said one end.

12. A cyclone separator as claimed in claim 11 wherein the overflow outlet has a diameter in the range $1/10^{th}$ to $1/30^{th}$ said diameter at said one end.

13. A cyclone separator as claimed in any one of claims 1 and 2 wherein said inlet portion, where provided, is of length in the range 0.5 to 1.5 times the diameter of the separating chamber at said one end.

14. A cyclone separator as claimed in any one of claims 1 and 2 wherein diameter $d_1$ is equal to $d_i$.

* * * * *